United States Patent [19]
Agnello

[11] Patent Number: 6,116,583
[45] Date of Patent: Sep. 12, 2000

[54] NESTABLE FRACTIONATION TRAY ANTIPENETRATION PANS

[75] Inventor: Joseph Agnello, Grand Island, N.Y.

[73] Assignee: UOP LLC, Des Plaines, Ill.

[21] Appl. No.: 09/283,082

[22] Filed: Mar. 31, 1999

[51] Int. Cl.[7] .................................................. B01F 3/04
[52] U.S. Cl. ..................................... 261/114.1; 261/114.5
[58] Field of Search ............................. 261/114.1, 114.5

[56] References Cited

U.S. PATENT DOCUMENTS

| | | | |
|---|---|---|---|
| 3,410,540 | 11/1968 | Bruckert | 261/114.1 |
| 3,685,811 | 8/1972 | Heckmann et al. | 261/114.1 |
| 3,784,175 | 1/1974 | Hirao et al. | 261/114.1 |
| 4,159,291 | 6/1979 | Bruckert et al. | 261/114.1 |
| 4,433,983 | 2/1984 | Hodgson et al. | 261/114.1 |
| 4,550,000 | 10/1985 | Bentham | 261/114.1 |
| 5,098,615 | 3/1992 | Resetarits | 261/114.1 |
| 5,209,875 | 5/1993 | Miller et al. | 261/114.1 |
| 5,223,183 | 6/1993 | Monkelbaan et al. | 261/114.1 |
| 5,244,604 | 9/1993 | Miller et al. | 261/114.1 |
| 5,318,732 | 6/1994 | Monkelbaan et al. | 261/114.1 |
| 5,382,390 | 1/1995 | Resetarits et al. | 261/114.3 |
| 5,573,714 | 11/1996 | Monkelbaan et al. | 261/114.5 |

OTHER PUBLICATIONS

Kirkpatrick, R.D. "MD trays can provide savings in propylene purification". *The Oil and Gas Journal.* Apr. 3, 1978. pp. 72–83.

*Primary Examiner*—C. Scott Bushey
*Attorney, Agent, or Firm*—John G. Tolomei; John F. Spears, Jr.

[57] ABSTRACT

A low cost antipenetration pan for use on fractionation trays is attached to the bottom of downcomers via releasable clips which slide through slots in the bottom of the downcomer. The clips are at the end of the legs of the pan, and the legs may slide upward through the slots to allow the legs to nest within the downcomer during shipment.

10 Claims, 1 Drawing Sheet

ANTI PENETRATION PAN

NESTABLE FRACTIONATION TRAY ANTIPENETRATION PANS

FIELD OF THE INVENTION

The invention relates to a mechanical apparatus for use in the separation of volatile chemical compounds by fractional distillation. The invention more directly relates to the structure of fractionation trays used in a fractionation column. The invention specifically relates to the design of an antipenetration pan which is suspended below the downcomer of multiple downcomer fractionation trays to improve the performance of the trays.

BACKGROUND OF THE INVENTION

Fractionation trays are widely used in the petrochemical and petroleum refining industries to promote the multistage vapor-liquid contacting performed in fractionation columns. The normal configuration of a fractionation column includes about 10 to 120 individual trays. Normally the structure of each tray in a column is the same. The trays are mounted horizontally at uniform vertical distances referred to as the tray spacing of the column. This distance may vary within different parts of the column but is normally considered constant.

Vapor generated at the bottom of the column rises through the tray, which supports a quantity of liquid. The passage of the vapor through the liquid generates bubbles referred to as froth. The high surface area of the froth helps to quickly establish a compositional equilibrium between the vapor and liquid phases on the tray. The vapor loses less volatile material to the liquid and thus becomes slightly more volatile as it passes upward through each tray. The liquid separates from the froth and carries heavier components downward to the next lower tray. This froth formation and separation is performed on each tray. Trays therefore perform the two functions of contacting the rising vapor with liquid and then allowing the two phases to separate and flow in different directions. When the steps are performed a suitable number of times, the process can lead to highly effective separation of chemical compounds based upon their relative volatility.

RELATED ART

Multiple downcomer fractionation trays are described in an article which appeared at page 72 of the Apr. 3, 1978 edition of *The Oil and Gas Journal*. FIG. 1 of this reference shows the characteristic layout of a number of parallel trough-like downcomers across the tray. It also shows the downcomers of vertically adjacent trays can be oriented in different directions; e.g., perpendicular to limit passage of liquid from the downcomers into the downcomer of the next lower tray.

U.S. Pat. No. 5,209,875 issued to R. J. Miller et al. introduced the concept of an "antipenetration pan" which is supported under the liquid openings in the bottom of the downcomers of multiple downcomer trays. These devices are shown as supported by threaded rods leading to the downcomers or the tray below. Other structures are described in the text.

BRIEF SUMMARY OF THE INVENTION

The invention is an improved antipenetration pan and integrated fractionation tray characterized by the pan hanging from legs which snap into place in slots in the bottom of the tray's downcomers. This allows for very quick and convenient installation and replacement of the antipenetration pans. In addition the legs preferably can slide through the slots into the downcomer, which allows the tray to be conveniently shipped and installed into a column with the antipenetration pans attached.

A broad characterization of the invention is an apparatus for attachment to a substantially flat surface located at the bottom portion of a downcomer of a fractionation tray, which apparatus comprises a unitary body comprising a substantially planar major portion, which when attached to the flat surface is aligned in a plane parallel to the bottom of the downcomer; and a pair of opposing legs attached to opposite ends of the major portion, with the legs being parallel to each other and perpendicular to the major portion of the apparatus and terminating with a means to fasten into openings in the flat surface located at the bottom portion of the downcomer.

DETAILED DESCRIPTION AND PREFERRED EMBODIMENTS

Figures 1, 2:
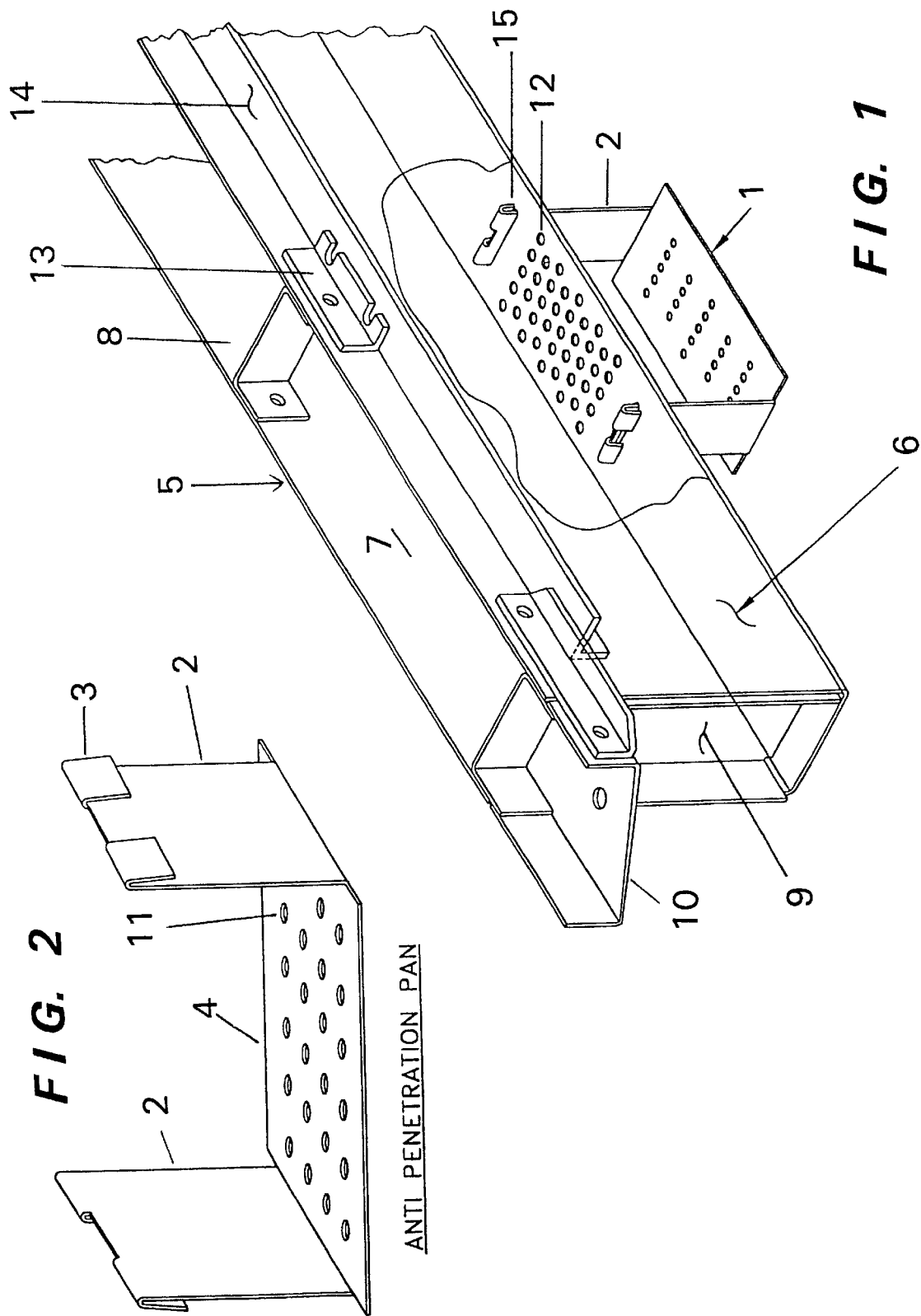
FIG. 1 is a drawing of a trough-like downcomer 5 having an antipenetration pan 1 hanging from bottom of the downcomer by the legs 2.
FIG. 2 is a drawing of an antipenetration pan showing in more detail a preferred configuration of the retention mechanism or clip 3 on the ends of the legs of the pan.

Fractionation trays find utility in separating a wide variety of chemicals including hydrocarbons, alcohols, ethers and other compounds in petroleum refineries, petrochemical units and chemical manufacturing plants. As with any useful industrial equipment, there is a constant effort made to improve the performance and lower the cost of the equipment. Several different types of trays, each having its own advantages and disadvantages have been developed. A simple pictorial depiction of several different types of trays; e.g. sieve trays, dual flow trays and Turbogrid trays is provided at pages 3–4 of *Distillation Tray Fundamentals*, by M. J. Lockett published by Cambridge University Press, 1986.

In a fractional distillation column, a multicomponent feed stream is separated into an overhead vapor stream comprising a more volatile chemical compound removed overhead and a bottoms liquid stream comprising a less volatile compound. That is, the compounds entering the column are separated therein with the more volatile compound(s) being carried upward through the column by an ascending vapor stream. The vapor stream passes through the trays and eventually exits the column as an overhead vapor. A portion of the condensate derived from the overhead vapor is normally returned to the top of the column as liquid-phase reflux. The less volatile component(s) of the feed are concentrated into the descending liquid-phase stream and eventually removed from the bottom of the column. Heat and vapor are supplied to the bottom of the column by a reboiler as by vaporizing a portion of the bottoms liquid and passing the resultant vapor into the bottom of the column.

Fractionation trays are employed within the column as a means of promoting vapor-liquid contacting and froth formation which leads to the exchange of compounds between the vapor and liquid phases based upon their relative volatility. The trays have separate areas devoted to the upward passage of vapor, which are normally referred to as the "decking" of the tray, and other areas which collect the froth. The froth is allowed to deaerate releasing "clear liquid"

which descends to the next lower tray through a part of the tray referred to as a downcomer. Due to the high economic impact of fractionation column operation and capital costs and the importance of a good separation, which is required in most refining and petrochemical processes, there has been much development in the area of fractionation tray design.

A specific type of tray is the multiple downcomer tray shown in U.S. Pat. Nos. 3,410,540; 5,318,732 and 5,382,390. This tray type is also described in the cited article appearing at page 72 of the Apr. 3, 1978 edition of *The Oil and Gas Journal*. This article includes a figure showing the basic characteristics of a multiple downcomer tray including a plurality of long, parallel trough-like downcomers evenly spaced across the surface of the tray, with bands of planar decking located therebetween. The preferred grouping of the liquid sealable outlets in the bottom of the downcomers and the transverse or perpendicular alignment of the downcomers on vertically adjacent downcomers are also shown. The subject invention has great benefit when applied to multiple downcomer trays but can also be applied to more conventional trays such as crossflow trays having chordal downcomers at the side of the tray. The subject invention can be employed as a revamp of an existing crossflow or multiple downcomer tray.

Multiple downcomer trays have several advantages including great flexibility in operation, mechanical height and tray spacing, very good capacity which allows their use in debottlenecking existing columns, the ability to function at relatively small vertical tray spacings, and the ability to handle high liquid loads due to a high ratio of downcomer inlet length to deck area. However, as with any tray there is always a desire to improve cost and performance. A recognized problem of multiple downcomer trays is that the liquid exiting the bottom of the downcomers can impact the perforated decking area of the tray below with enough velocity that some of the liquid is forced through the perforations in the decking. This liquid bypasses the contacting step performed on this tray and therefore the performance of the tray and column is reduced.

Previously cited U.S. Pat. No. 5,209,875 presented a solution to this problem termed an "antipenetration pan". These are substantially flat perforated plates supported at an elevation between the outlet at the bottom of the downcomer and the top of the underlying decking. These plates intercept the falling liquid and reduce the velocity of the liquid impacting on the tray decking. The antipenetration pans also slightly diffuse the falling liquid, with the result that much less liquid is forced through the decking. As an added benefit the decking areas on which the liquid falls tends to stay more active, that is, has upward vapor flow which promotes vapor-liquid contacting on the lower tray.

It is an objective of the subject invention to provide an improved antipenetration pan for multiple downcomer trays. It is another objective to provide a multiple downcomer tray antipenetration pan which is highly compatible with shipping assembled trays.

These objectives are achieved through an improvement in the design of the legs which support the antipenetration pan. The new design provides several different benefits relating not only to the costs of constructing and installing the antipenetration pans but also to the cost of shipping and installing the overall tray. A review of the previously cited patent shows that the prior art antipenetration pans are assembled from several different pieces. Further they are attached to either the downcomer above or the decking below by mechanical legs which are attached to the pan and the tray elements by bolts and nuts or other hand completed fastening means. The attachment of the prior antipenetration pans is therefore labor intensive, which is even more troublesome if performed in the close confines of a fractionation column. Further, if the prior art pans are attached to a new tray and the tray is then shipped from the assembly plant to the column site, it is necessary to supply a much larger shipping container and to add internal bracing to protect the pans from damage.

The antipenetration pans of the subject invention are constructed at a lower cost since they are fabricated by a single press cutting operation followed by a few bending steps. There is no hand assembly requiring the pans to be bolted together. Further, since the pans are designed to clip onto the bottom of the downcomer there is much less time required to install the pans. The pan is simply positioned under the downcomer and then the two legs are pushed upward through slots in the bottom of the downcomer. A releasable retention mechanism such as one or more slightly inclined tabs are punched into the top end of each metal leg forming a catch, which with a slight upward pressure can be made to slide upward through the slot. Once through the slot the tab returns to its original shape and prevents the leg from passing back downward. Two or more tabs may be spaced along the width of a leg to hold the pan flat and prevent it from rocking.

The locking mechanism which holds the legs of the antipenetration pan in place can take several different forms. It can be a single bent tab, multiple tabs facing both sides of the leg, or other mechanical contrivances which function to allow the leg to be inserted but block its fall out of the slot in the bottom of the downcomer. This mechanism is located at the top of the leg, which is intended to refer to the terminal portion of the leg which is normally located at the plane of the bottom of the downcomer. The attachment mechanism can also be fabricated from a separate piece of material which is attached to the end of the leg such as a clip formed from a more flexible or more springy metal than the leg of the pan. Such devices can be fabricated to prevent vertical movement of the pan, but it is preferred that the legs of the pan are free to move into the open volume in the downcomer. The attachment of the antipenetration pan can be secured by an additional device such as a cotter pin or bolt passing through the leg at a point above the slot. This would be attached after the leg is inserted. Such a device is totally optional and is not preferred. Different retention mechanisms can be used on different legs.

Another means of securing the legs against movement in one or both directions would be the provision of a small bendable metal edge tab(s) at the top of the leg. These edge tabs may be punched in the initial forming step and can take at least three forms. The first type of edge tab would be an extra piece of metal which extends away from the side edge of the leg. The second type of tab is formed by punching two cuts perpendicular to the side edge of the leg such that the tab can be easily bent away from the plane of the leg. If this type of tab is provided at the very end of the leg only one cut would be required. Two tabs can be provided on the same side of the leg with one tab to be located above the downcomer bottom plate and one below the bottom plate. The tabs could be bent, for instance, after the leg is inserted into the slots. Alternatively a portion or all of the top edge of the leg of the pan could be bent to the side to form a lip which catches on the edge of the slot and prevents the pan from falling out of the slot. This third type of tab is shown as element 3 of the drawing. Finally a tab can be formed by three cuts made in a central portion of the upper end of the leg allowing the tab to project from the plane of the leg as an inclined plane. The tab should be small enough to be relatively easy to bend, thus facilitating passage through the slot. A row of small blade-like tabs can extend away from one or both opposing surfaces of the leg.

The slots in the downcomer bottom plate must be large enough to allow at least the extension mechanism of the legs of the antipenetration pan to pass through. Their dimensions are otherwise not critical. The width of the slots should be within the broad range of about 1.1 to 2.2 times the thickness of the metal forming the leg of the pan. This means the width of the slots can range from about 1.6 to about 3.5 mm. A tab formed by a slight bending of the metal will require less width than the doubled-over clip 3 of the figures. As this part of the fractionation tray is intended to transfer liquid to the next lower tray, leakage can be tolerated and a liquid tight seal is not required. The slots should not however be so loose as to allow the formation of a stream of liquid which falls to the next tray. It is preferred that the slots are sized such that the entire leg may pass through into the downcomer.

The free vertical movement of the pan, which the preferred retention mechanisms allow, facilitates the shipment of the assembled tray or downcomer. By sliding the legs into the hollow void volume of the downcomer the central portion of the antipenetration pan can be raised until it is adjacent to the bottom plate of the downcomer. The combined downcomer and antipenetration pan then take up no more space than the downcomer itself, which reduces the size and weight of the shipping crate. In addition the legs are protected by their location inside the downcomer, and the central portion of the antipenetration pan is safely stored against the rigid bottom of the downcomer.

The antipenetration pan of the subject invention can be described as an apparatus for attachment to the bottom of a downcomer of a multiple downcomer fractionation tray, which apparatus comprises a unitary body comprising a substantially planar major portion, which when attached to the downcomer is aligned parallel to the bottom of the downcomer; a pair of opposing legs of equal length attached to opposite ends of the major portion, with the legs being parallel to each other and perpendicular to the major portion of the apparatus, and adapted to slide through slots provided in a bottom portion of the downcomer such that at least a major portion of the legs may slidably enter into the downcomer.

Multiple downcomer trays have several distinguishing physical characteristics. For instance, a multiple downcomer tray does not have the receiving pan traditionally shown on cross-flow trays. This is the normally imperforate section of tray deck located below the bottom of a downcomer. It is therefore the area of a tray upon which the liquid descending through the downcomer impacts before passing horizontally onto the perforated decking of the tray. Receiving pans are normally located directly below the downcomer leading from the next above conventional fractionation tray. The horizontal surface area of a multiple downcomer fractionation tray is divided into depressed areas functioning as downcomer means and flat vapor-liquid contacting area normally referred to as decking. There are no imperforate areas allocated to receiving descending liquid from the tray located immediately above.

Another distinguishing feature of a multiple downcomer type fractionation tray is the provision of a relatively large number of parallel downcomer means at equal distances across the tray. Each tray can employ from one to fifteen or more downcomers. These downcomer means are spaced relatively close together compared to those of the more common crossflow fractionation trays as they are spread across the surface of the tray rather than being at the periphery of the tray. The distance between adjacent downcomers (measured between their side walls) of the same multiple downcomer tray will be between 0.2 and 1.0 meters and preferably less than about 0.5 meter. This results in a tray having a unique design consisting of the alternating decking areas and downcomer means evenly spaced across the upper surface of the fractionation tray.

The structure of the downcomers of a multiple downcomer tray is also unique compared to the downcomers employed upon crossflow fractionation trays. The downcomer means do not extend all the way down to the next lower fractionation tray. Rather they stop at a much higher intermediate level located in the void cylindrical volume between the two trays. The downcomer descending from the tray above therefore normally stops well above the deck surface of a lower tray and above the inlet to the downcomers of the tray below. The inlet to the downcomer of a tray functions as the outlet weir of the tray, and the bottom of the downcomer is preferably well above the outlet-weir of the lower tray. The horizontal endson cross-section of the downcomers can have a wide variety of shapes ranging from rectangular to triangular.

A very distinctive feature of a multiple downcomer fractionation tray is the provision of a liquid sealable means near the bottom of the downcomer. The bottom of the downcomer is sealed sufficiently to retard the direct downward flow of liquid out of the downcomer. This causes the accumulation and retention of froth, which allows it to separate into clear liquid. The accumulated liquid covers the openings in the bottom portion of downcomer and seals the downcomer to the upward flow of vapor. This liquid sealable outlet is located well above the deck of the tray located immediately below. Preferably it is at a level above the inlet of the downcomers associated with this next lower tray. The clear liquid is collected in the lower portion of the downcomer and spills forth upon the next lower tray through the openings in the bottom of the downcomer. Some liquid may, if desired, exit through openings in the downcomer side walls. The openings are preferably grouped together and located such that the exiting liquid does not fall into a downcomer of the next lower tray.

The invention is illustrated in the drawing. In FIG. 1 the downcomer 5 is in the form of a long rectangular open topped box partially enclosed by the two parallel sidewalls 7, endwalls 9 and bottom plate 6. The substantially flat bottom plate 6 has openings 12 for downward liquid flow. Also shown are the slots 15 for the antipenetration pan legs. The downcomer can be formed from a single piece of metal which is bent to shape or assembled from small pieces which are bolted together. The boxlike shape shown in the drawing has great rigidity which allows the downcomer to function as a beam to support the tray. The strength of the downcomer is enhanced by a number of braces and stiffeners such as the internal cross opening stiffener 8 and the angled bracing brackets 13. The angled bar 14 which extends along the sidewall at the level of the tray decking also increases the strength of the assembly. However, the angled brackets 13 and bar 14 serve an additional function of supporting and retaining the thin metal decking plates which form the vapor-liquid contacting areas located between the adjacent downcomers. The decking can rest on the bar 14 and be held down by the bracket 13. In order to seal the end of the downcomer and to have the end of the downcomer match the geometry of the inside of the fractionation column, a small irregular shaped end extension 10 is attached to each end of the downcomer. The downcomer can have a different end-view cross section than that shown in the drawing. Alternative downcomer shapes are known including downcomers having a V-shaped cross-section formed by two inclined sidewalls. Therefore instance the downcomer could be square or V-shaped in cross-section.

The antipenetration pan 1 can be formed from a single (unitary) piece of thin e.g.,. 1.5 mm metal plate which is cut to size, punched and then bent to shape. This can be seen from FIG. 2, which is basically a larger view of the pan suspended from the downcomer of FIG. 1. The antipenetration pan has a major central portion 4 which is substantially planar, although the edges could be bent upward if desired. It is basically a flat piece of metal having a number of evenly spaced perforations 11 located between the two legs 2. The legs 2 are bent upward from the edge of the central portion and perpendicular to the central portion 4 of the pan. The legs substantially enclose the ends of the pan and therefore function as the lips of the prior art pans. The legs therefore serve to prevent liquid flow off the end of the pan. The two parallel legs 2 terminate in a compressible attachment or retention mechanism. Preferably this is in the form of two spring-like clips on the end of each leg as shown. The clips are sized such that they can be slid through two slots 15 in the bottom plate 6 of the downcomer, thus attaching the pan to the downcomer. As the tray is made of stiff metal the clips may be bent after installation to insure they do not slide back down through the slots.

The central portion of the antipenetration pan should be at least as large as the overall area in the bottom plate of the downcomer devoted to one group of openings 12 for liquid to fall from the downcomer. These openings are grouped together, with a separate antipenetration pan located under each group.

The perforations in the antipenetration pan are each preferably smaller in size and provide less total open area than the grouped perforations in the bottom of the downcomer. The pan can contain from about 20 to 40 individual perforations having a diameter of about 0.375 in. An example of the dimensions of the central portion of an antipenetration pan are a side to side width of about 6.25 in. and a depth of 5.25 in. The legs would have a depth of 3.5 in and a top to bottom length of 6 in. The legs are preferably rectangular in shape rather than tapered.

This arrangement of the downcomer assembly for a multiple downcomer fractionation tray may be characterized as comprising a trough-like downcomer comprising parallel sidewalls and a bottom plate having spaced apart groupings of openings for liquid flow; an antipenetration pan comprising; a unitary body comprising a substantially planar major portion, which when attached to the downcomer is aligned parallel to the bottom of the downcomer; and a pair of opposing legs of equal length attached to opposite ends of the major portion, with the legs being parallel to each other and perpendicular to the major portion of the apparatus and terminating with a retention mechanism which clips into slots in the bottom of the downcomer.

It is readily appreciated that various elements of the apparatus are subject to considerable variation. For instance, the apparatus may comprise four legs 2 to support the antipenetration pan, with one leg attached to each corner of the central portion of the pan and extending upward through its own slot 15. In other variations a single leg 2 at each end of the central portion could be perforated or could have a section removed at the top to form a valley between individual sections or sublegs which continue upward to the slots in the flat plate at the bottom of the downcomer.

Another area of variation is introduced by the possibility that the subject apparatus will be used on a preexisting fractionation tray, which can be other than a multiple downcomer type tray; that is, a tray already in use in a column may be retrofitted by attaching the subject antipenetration pan. Two specific items of note in relation to revamps are the use of existing slots in multiple downcomer type trays and modifications needed to support antipenetration pans from the downcomers of crossflow trays. As the openings in the bottom plate of a downcomer of a multiple downcomer type tray may be in the form of a group of parallel slots, two of these slots can be employed as the slots used to support the antipenetration pan. The preexisting slots are employed as the slots to which the legs are attached.

In the case of a revamp to a crossflow tray or for a new cross flow tray, installation of the subject trays will require more extensive modification. First, the downcomer of the crossflow tray must be terminated at a higher level. The downcomers typically comprise at least one vertical baffle which extends downward to near the next tray, sometimes with an outlet weir to provide a liquid seal. To employ an antipenetration pan, the bottom of the downcomer is raised to provide a space below it for the pan. Some form of liquid flow obstruction is provided at the bottom of the downcomer such that sufficient liquid accumulates to provide a seal against the upward flow of vapor. The legs of the antipenetration pan may be attached to this obstruction, especially if it includes any flat horizontal surface or plate. The legs and the retention mechanism may however be shaped to attach to non-horizontal parts of the bottom portion of the downcomer; that is, the legs could attach to inclined panels or a curved panel forming the bottom plate of the downcomer. The legs of the antipenetration pan could also attach to openings in inclined sidewalls of the downcomer.

The invention may therefore be characterized as a downcomer assembly for a multiple downcomer fractionation tray, which assembly comprises: a trough-like downcomer comprising parallel sidewalls and a bottom plate having spaced apart groupings of openings for liquid flow; and, an antipenetration pan comprising: a unitary body comprising a substantially planar major portion, which when attached to the downcomer is aligned parallel to the bottom of the downcomer; and, a pair of opposing legs of equal length attached to opposite ends of the major portion, with the legs being parallel to each other and perpendicular to the major portion of the apparatus and terminating with a retention mechanism which clips into slots in the bottom of the downcomer.

What is claimed:

1. An apparatus for attachment to a substantially flat surface located at the bottom portion of a downcomer of a fractionation tray, which apparatus comprises a unitary body comprising:
   a.) a substantially planar major portion, which when attached to the downcomer is aligned in a plane parallel to said flat surface; and,
   b.) a pair of opposing legs attached to opposite ends of the major portion, with the legs being parallel to each other and perpendicular to the major portion of the apparatus and terminating with a means to fasten into openings in said flat surface located at the bottom portion of the downcomer, said means to fasten allowing sliding movement of the major portion of the apparatus toward the bottom of the downcomer.

2. The apparatus of claim 1 wherein the fractionation tray is a multiple downcomer tray.

3. The apparatus of claim 1 wherein the fractionation tray is a crossflow tray.

4. An apparatus for attachment to the bottom of a downcomer of a multiple downcomer fractionation tray, which apparatus comprises:

a.) a substantially planar major portion, which when attached to the downcomer is aligned parallel to the bottom of the downcomer; and, b.) a pair of opposing legs of equal length attached to opposite ends of the major portion, with the legs being parallel to each other and perpendicular to the major portion of the apparatus, and adapted to slide through slots provided in a bottom portion of the downcomer such that at least a portion of the legs may enter into the downcomer.

5. The apparatus of claim 4 wherein the legs of the apparatus are spaced apart and sized to allow attachment of the apparatus by means of preexisting slots in the downcomer originally provided for downward liquid passage thereby allowing a facile revamp of a preexisting tray.

6. The apparatus of claim 4 wherein the legs terminate with a self-locking retention mechanism.

7. The apparatus of claim 4 wherein the apparatus comprises only two legs.

8. The apparatus of claim 4 wherein the apparatus is fabricated out of a single piece of metal.

9. A downcomer assembly for a multiple downcomer fractionation tray, which assembly comprises:

a.) a trough-shaped downcomer comprising parallel sidewalls and a bottom plate having spaced apart groupings of openings for liquid flow; and, b.) an antipenetration pan comprising:

i.) a unitary body comprising a substantially planar major portion, which when attached to the downcomer is aligned parallel to the bottom of the downcomer; and, ii.) a pair of opposing legs of equal length attached to opposite ends of the major portion, with the legs being parallel to each other and perpendicular to the major portion of the apparatus and terminating with a retention mechanism which clips into slots in the bottom of the downcomer, the legs being slidable within the slots of the downcomer.

10. The assembly of claim 9 wherein the retention mechanism is releasable and the legs of the antipenetration pan may slide through the slots into the downcomer.

* * * * *